April 21, 1925.  
W. A. TRYON  
SHACKLE  
Filed Feb. 9, 1923
1,534,193
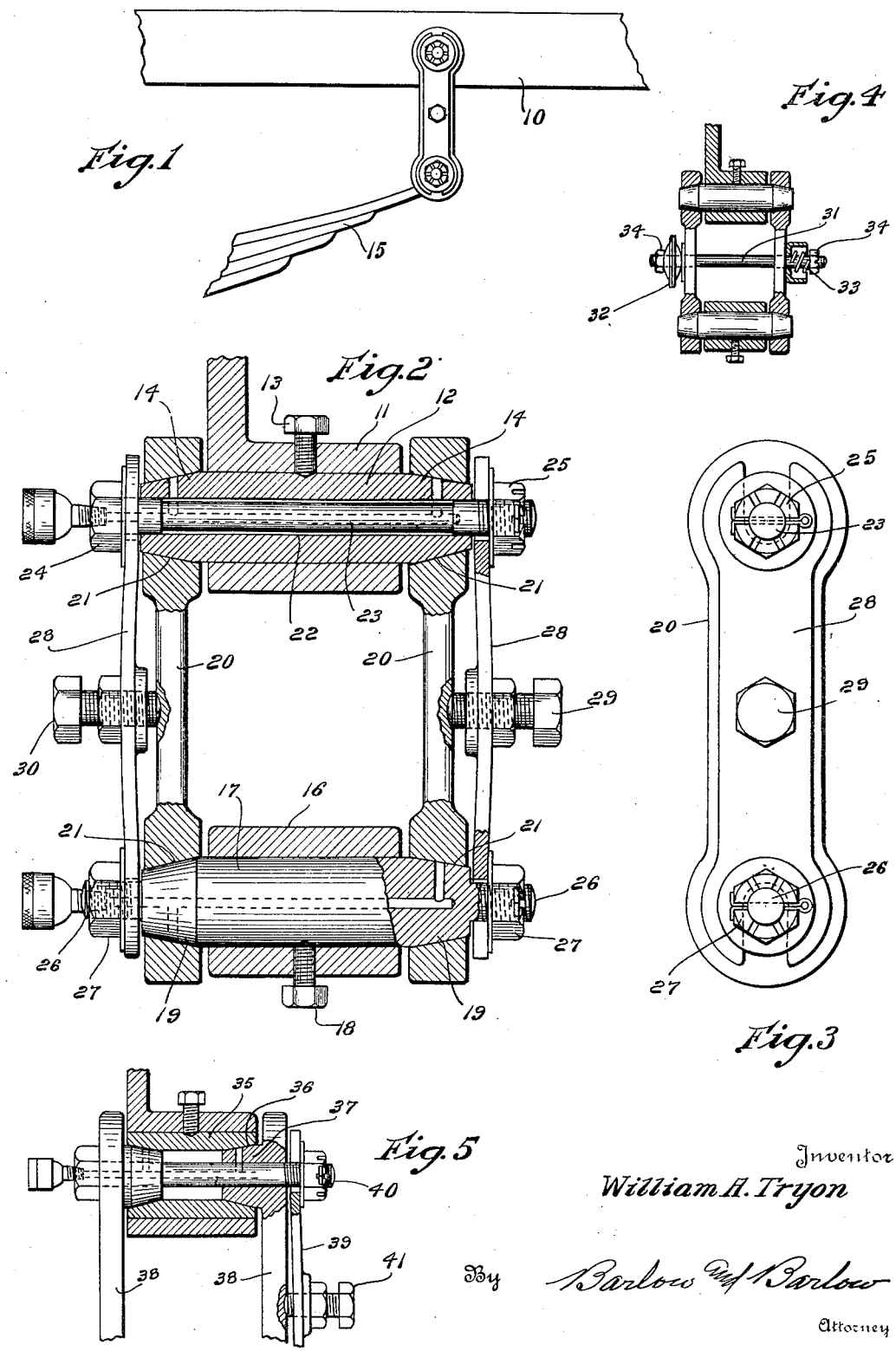
Inventor  
William A. Tryon  
By Barlow and Barlow  
Attorney Patented Apr. 21, 1925.

1,534,193

UNITED STATES PATENT OFFICE.

WILLIAM A. TRYON, OF PROVIDENCE, RHODE ISLAND.

SHACKLE.

Application filed February 9, 1923. Serial No. 618,134.

*To all whom it may concern:*

Be it known that I, WILLIAM A. TRYON, a citizen of the United States, residing at Providence, in the county of Providence and State of Rhode Island, have invented certain new and useful Improvements in Shackles, of which the following is a specification.

This invention relates to improvements in shackles more particularly adapted for use in yieldably connecting vehicle springs to the chassis parts thereof, and is an improvement on my prior Patent No. 1,367,760; and the object of this invention is to provide an improved construction of such a shackle adapted to automatically take up the wear of the moving parts to prevent the same from rattling.

With these and other objects in view, the invention consists of certain novel features of construction, as will be more fully described, and particularly pointed out in the appended claims.

In the accompanying drawings:

Figure 1 is a side elevation illustrating a portion of a vehicle spring as connected to the chassis by my improved shackle.

Figure 2 is a sectional side elevation illustrating the general construction of my improved shackle.

Figure 3 is an edge view showing one of the shackle links and the set screw for adjusting the tension of the spring plate.

Figure 4 is a modification illustrating another construction by which tension may be applied to the link members intermediate their bearing ends.

Figure 5 is another modification illustrating another construction of tapered bearings by which the wear of the moving parts may be taken up.

It is found in the practical construction and operation of shackles of this character of advantage to provide a construction that can be manufactured in a practical way and one which will be effective in its action to automatically take up the wear at the ends of the pins and so prevent rattling which ordinarily occurs in devices of this character; and the following is a detailed description of one means by which these results may be accomplished:—

With reference to the drawings, 10 designates the frame portion of a vehicle chassis which is provided with a bearing 11 in which a pin member 12 of my improved shackle is designed to fit and which is preferably retained in fixed position in this bearing member by means of a binding bolt 13.

The ends 14 of this bearing pin are arranged to project beyond the bearing portion 11 of the chassis and these ends are preferably tapered forming frustro conical bearing portions.

The free end of the vehicle spring 15 is usually provided with a tubular bearing portion 16 in which a shackle pin 17 is removably secured by a set screw 18, the ends 19 of this pin being arranged to extend beyond the sides of the bearing portion 16 and are tapered outwardly the same as those of pin 12.

In order to connect these two pins together, I have provided a pair of link members 20 each having a tapered bearing bore 21 in its opposite ends to receive and fit the tapered portions 14 and 19 of the pins 12 and 17, respectively.

In order to retain the ends of these links upon their tapered bearings, I have formed a hole 22 through the pin 12 and through this hole I have passed a bolt 23 having a head 14 at one end and a nut 25 at its opposite end, which construction may also be applied to pin 17 if desired, but in this pin I have herein shown the same as being provided at each of its tapered ends with an integral threaded extension 26 on which is screwed and secured the nuts 27, and in order to provide a yielding tension on links 20 to press them onto their respective tapered bearing portions, I have shown a spring plate 28 mounted at either end of the bearing pins 12 and 17, the ends of the plate on the right being retained beneath the nuts 25 and 27, respectively, while the one on the left is shown as being held between the bolt head 24 and the nut 27 respectively and tension from these spring plates is applied to the middle portion of each link through set screws 29 and 30, each of which may be adjusted to apply the required tension to the links in order to cause them to automatically take up the wear of the working parts as it occurs.

In some instances, instead of employing spring plates 28 for exerting a take-up pressure upon the links, I may, if desired, as illustrated in Figure 4, extend a bolt 31 through these links with springs 32 and 33 at its opposite ends, either of the coil or cup plate variety, adapted to yieldably press the links onto their bearings. The tension of these springs may be adjusted by setting up either one or both of the nuts 34.

As illustrated in Figure 5, I may form the inner surfaces at the ends of the bushing 35 tapering as at 36 and provide inwardly extending tapering portions or bosses 37 on the opposite links 38, and I press these tapering bosses into their respective tapering bearings by means of springs 39 acting through a bolt 40, and the tension of the springs may be adjusted by a set screw 41.

My improved construction of shackle is extremely simple, practical and inexpensive to manufacture and it is found in practice that the device is very effective in its operation and by its use the wear of the parts is automatically taken up as it occurs thus positively preventing the usual rattling of such parts.

The foregoing description is directed solely towards the construction illustrated, but I desire it to be understood, that I reserve the privilege of resorting to all the mechanical changes to which the device is susceptible, the invention being defined and limited only by the terms of the appended claims.

I claim:

1. A spring shackle for vehicles comprising bearing pins, each tapered on its opposite ends, one mounted in the chassis parts and one in the spring parts, links connecting the corresponding ends of said pins and having bearing openings to fit the tapered ends thereof, and spring means acting on said links midway their ends to automatically take up the wear upon their bearings.

2. A spring shackle for vehicles comprising bearing pins, each tapered at its opposite ends, one mounted in the chassis parts and one in the spring parts, links connecting the corresponding ends of said pins and having bearing openings to fit the tapered ends thereof, spring means acting on said links midway their ends to automatically take up the wear upon their bearings, and means for adjusting the tension of said springs.

3. A spring shackle for vehicles comprising bearing pins, each tapered on its opposite ends, one mounted in the chassis parts and one in the spring parts, links connecting the corresponding ends of said pins and having bearing openings to fit the tapered ends thereof, and a spring plate acting on said links causing them to automatically take up the wear as it occurs on said tapered bearings.

4. A spring shackle for vehicles comprising bearing pins, each tapered on its opposite ends, one mounted in the chassis parts and one in the spring parts, links connecting the corresponding ends of said pins and having bearing openings to fit the tapered ends thereof, a spring plate acting on said links causing them to automatically take up the wear as it occurs on said tapered bearings, and adjustable means for regulating the pressure of the spring upon the links.

5. A spring shackle for vehicles comprising bearing pins each tapered on its opposite ends, one mounted in the chassis parts and one mounted in the spring parts, a pair of shackle links, each connecting corresponding ends of said pins and having bearings shaped to fit the tapered ends of the pins, and spring means acting upon the said links causing them to automatically take up the wear on said tapered surfaces.

6. A spring shackle for vehicles comprising a bearing pin tapered on its opposite ends and mounted in the chassis parts, a coresponding pin mounted in the spring parts, links connecting the corresponding ends of said pins and having bearing openings to fit the tapered ends of the pins, a bolt member extending through said pin, and spring means acting through said bolt to automatically take up the wear on said tapered surfaces.

In testimony whereof I affix my signature.

WILLIAM A. TRYON.